United States Patent
Rimhagen et al.

(10) Patent No.: US 10,993,168 B2
(45) Date of Patent: Apr. 27, 2021

(54) METHODS OF AND DEVICE FOR AUTONOMOUS CONFIGURATION OF A RELAY NODE DEVICE IN MESH NETWORK

(71) Applicant: Telefonaktiebolaget LM Ericsson (publ), Stockholm (SE)

(72) Inventors: Thomas Rimhagen, Linköping (SE); Per Skillermark, Årsta (SE)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 268 days.

(21) Appl. No.: 16/094,068

(22) PCT Filed: Sep. 18, 2018

(86) PCT No.: PCT/EP2018/075204
§ 371 (c)(1),
(2) Date: Oct. 16, 2018

(87) PCT Pub. No.: WO2020/057730
PCT Pub. Date: Mar. 26, 2020

(65) Prior Publication Data
US 2020/0092792 A1    Mar. 19, 2020

(51) Int. Cl.
*H04W 40/24* (2009.01)
*H04L 12/733* (2013.01)
(Continued)

(52) U.S. Cl.
CPC ........... *H04W 40/248* (2013.01); *H04L 45/20* (2013.01); *H04W 40/244* (2013.01); *H04W 48/08* (2013.01); *H04W 84/18* (2013.01)

(58) Field of Classification Search
CPC . H04W 40/248; H04W 40/244; H04W 40/24; H04W 40/246; H04W 48/08;
(Continued)

(56) References Cited

U.S. PATENT DOCUMENTS

2007/0195728 A1* 8/2007 Chen .................. H04W 40/24
                                                          370/328
2007/0268856 A1  11/2007 Wijting et al.
(Continued)

OTHER PUBLICATIONS

Li, Mo, et al., "A Survey on Topology Control in Wireless Sensor Networks: Taxonomy, Comparative Study, and Open Issues", Proceedings of the IEEE, vol. 101, No. 12, Dec. 2013, 2538-2557.
(Continued)

*Primary Examiner* — Ian N Moore
*Assistant Examiner* — Brian T Le
(74) *Attorney, Agent, or Firm* — Murphy, Bilak & Homiller, PLLC

(57) ABSTRACT

A method for deactivating a relay feature of a relay node in a mesh network comprising a plurality of nodes, wherein said relay node formulates a connectivity report comprising routing information to a beacon node in said mesh network, said routing information being based on connectivity control messages received from said beacon node. The method comprises the steps of transmitting, by said relay node, said connectivity report to neighbouring nodes, transmitting, by said relay node, a query message to said neighbouring nodes for querying whether said relay feature of said relay node may be deactivated receiving, by said relay node, response messages from said neighbouring nodes, in response to said query message, wherein each of said response messages indicates that said relay feature of said relay node may be deactivated, and deactivating, by said relay node, said relay feature of said relay node based on said response messages from all of said neighbouring nodes. Complementary methods and devices for performing a method according to the present disclosure are also presented herein.

11 Claims, 3 Drawing Sheets

(51) Int. Cl.
*H04W 48/08* (2009.01)
*H04W 84/18* (2009.01)

(58) Field of Classification Search
CPC ..... H04W 48/10; H04W 48/12; H04W 48/14; H04W 84/18
See application file for complete search history.

(56) References Cited

U.S. PATENT DOCUMENTS

2017/0134227 A1    5/2017  Song et al.
2017/0295455 A1* 10/2017  Kwon .................... H04W 4/80
2018/0167864 A1    6/2018  Johnston
2018/0343200 A1* 11/2018  Jana ..................... H04L 45/02

OTHER PUBLICATIONS

Unknown, Author, "Bluetooth mesh networking", Ericsson, Jul. 22, 2017, 1-25.

Unknown, Author, "Mesh Profile", Bluetooth Specification, Revision V. 1.0., Mesh Working Group, Jul. 13, 2017, 1-331.

Unknown, Author, "Topology control", Wikipedia, https://en.wikipedia.org/w/index.phptitle=Topology_control&oldid=849028603, revised Jul. 6, 2018, 1-4.

Garcia-Saavedra, Andres, et al., "SOLOR: Self-Optimizing WLANs with Legacy-Compatible Opportunistic Relays", IEEE/ACM Transactions on Networking, vol. 23, No. 4, Aug. 1, 2015, 14 pages.

* cited by examiner

METHODS OF AND DEVICE FOR AUTONOMOUS CONFIGURATION OF A RELAY NODE DEVICE IN MESH NETWORK

FIELD OF THE INVENTION

The invention according to the present disclosure generally relates to the field of mesh communication networks and more specifically, to configuring a relay feature of a node device in a mesh network.

BACKGROUND

The Bluetooth Mesh profile specification, released in July 2017, introduces mesh networking for Bluetooth Low Energy, BLE, technology. On the link layer, Bluetooth Mesh makes use of contention-based broadcasting while network layer relaying of messages is based on message flooding. Simply described, with message flooding, the sender of a message sends the message to all its neighbours, who in turn relays it to all its neighbours and so on; in this way, the message proliferates to all nodes in the network, and hence the message is also delivered to its destination. Flooding is a simple and robust networking technique. For example, it inherently copes with node mobility and topology changes, however, it is wasteful of bandwidth.

To avoid unrestricted relaying of messages, Bluetooth Mesh uses flooding with a set of restrictions, by employing:

Message cache. A message cache is used to keep track of relayed messages and restrict nodes to re-relay a message that it has already relayed.

Time-to-live, TTL, counter. Every message includes a TTL counter that is initialized by the message sender and is decremented at each hop. When the TTL counter expires, the message is not relayed further in the network.

In Bluetooth Mesh this approach is referred to as managed flooding. Furthermore, relaying in Bluetooth Mesh networks can only be performed by nodes that support the relay feature, and such nodes are commonly referred to as relay nodes. The relay feature in relay nodes can be configured to be in an on/active state or in an off/deactivated state. As a result, messages are only relayed by nodes that support the relay feature and has the feature turned on.

The performance of a Bluetooth Mesh network is highly dependent on the relay node deployment and configuration. On one hand, the relay node deployment should be dense enough to provide network connectivity to all nodes and offer some level of path redundancy. On the other hand, a too high density of active relay nodes implies an increased risk of over-the-air collisions and lost messages, which degrades performance. Finally, any viable relay node deployment and configuration solution must assert that the network connectivity is maintained, i.e. that there is a path between any node in the network to any other node and that the network does not reduce into multiple connected components. That is, the network should not reduce to separate network parts without any connection in between.

Topology control is a technique used in distributed computing to alter the underlying mesh network to reduce the cost of distributed algorithms if run over the new resulting graphs. Within the field of wireless sensor networks, a goal of topology control is to save energy, reduce interference between nodes and extend lifetime of the network. Topology control techniques are often classified into two categories—namely network coverage and network connectivity.

Here, network coverage refers to the area over which the network has sensing capabilities, or how well the sensor network monitors the target field. Network connectivity, on the other hand, refers to how well sensor nodes are mutually connected and the message delivery in the network. The connectivity part has relevance for this invention, while the sensor coverage aspects are not further discussed here.

Connectivity topology control may further be categorized into a temporal domain and a spatial domain. In the temporal category, the radio duty cycle i.e. active/deactive schedule, is configured to prolong node and system lifetimes while at the same time keeping equivalent capabilities in the topological sense. Spatial connectivity control adjusts the node's output power to improve connectivity among nodes.

Connectivity control techniques known from the literature focus on either adjusting node's duty cycles or output power to improve the connectivity of the network. To operate at a "low" duty cycle enhances the lifetime of the network, however, it also reduces the network throughput and capacity and does not necessarily solve the Bluetooth Mesh problem with over-the-air collisions caused by a too high relay node density. Connectivity control based on output power adjustment, on the other hand, can be used to reduce the problem of over-the-air packet collisions, but a disadvantage with such methods include an increased hop count, which in turn leads to an increased message delay, lower throughput, and reduced capacity. No known method considers the specific properties of link layer broadcasting and network layer message flooding utilized in Bluetooth Mesh.

Furthermore, existing methods for relay node configuration in a Bluetooth Mesh network involve manually executed tasks performed by a person skilled in the art. Manual involvement is typically costly, and the lack of skilled personnel imposes risks that networks are improperly configured or not configured at all, resulting in poor network performance.

Moreover, under dynamic conditions, for example, when nodes are added to and removed from a network, or when nodes are mobile, relay node configuration must be performed on a regular basis to assure that a high network performance is maintained over time. For Bluetooth Mesh, a manual re-configuration of relay nodes would not be feasible both from a practical perspective and a sheer size perspective, but also from a cost perspective, as Bluetooth Mesh is a technology whose attractiveness is related to low cost and simplicity.

Accordingly, it is desirable to find new methods and apparatuses that facilitate automatic configuration of relay nodes in a mesh network. Methods and apparatuses that facilitate a distributed solution are of special interest, as such distributed solutions typically limit the information collection and are less complex.

SUMMARY

An object of the invention according to the present disclosure is to provide an autonomous, distributed solution to configure relay nodes in a mesh network.

In a first aspect of the present disclosure, there is presented a method for deactivating a relay feature of a relay node in a mesh network comprising a plurality of nodes, wherein the relay node formulates a connectivity report comprising routing information to a beacon node in the network, the routing information being based on connectivity control messages received from the beacon node.

The method comprises the steps of transmitting, by the relay node, the connectivity report to neighbouring nodes, transmitting, by the relay node, a query message to the neighbouring nodes for querying whether the relay feature of the relay node may be deactivated, receiving, by the relay node, response messages from the neighbouring nodes, in response to the query message, wherein each of the response messages indicates that the relay feature of the relay node may be deactivated, and deactivating, by the relay node, the relay feature of the relay node based on the response messages from all of the neighbouring nodes.

The method introduces a concept of connectivity control messages broadcasted periodically by a beacon node in the mesh network and connectivity reports formulated by each nodes based on received connectivity control messages. A beacon node is a node in the mesh network that periodically sends connectivity control messages and has an always active relay feature, and may be logical entity that is, for instance, physically located within a gateway device. By introducing this concept, each node in the mesh network is capable of evaluating its connectivity to the beacon node and other nodes within the mesh network. The relay node sends a query message comprising a deactivation request to all of its neighbouring nodes. The mesh network comprises at least one beacon node.

The skilled person understands that a neighbouring node is a node that is only one hop away from a particular node in a mesh network. The connectivity report may be transmitted by all relay nodes irrespective of whether the relay feature is active or not. However, the query message is transmitted only by relay nodes whose relay feature is presently in an active state.

It may be ensured that the request is sent out only to neighbouring nodes by, for example, setting a Time To Live, TTL, value equal to 0. The neighbouring nodes can approve or disapprove this request. Upon receiving an approval from all of its neighbouring nodes, the relay feature may be deactivated. Receiving a disapproval from even one of the neighbouring nodes implies that the connectivity of that node within the mesh network may be adversely affected if the relay feature is deactivated. Consequently, the relay feature will not be deactivated.

By performing a method according to the present disclosure, an autonomous method of configuring relay nodes in a mesh network may be achieved. The solution activates and de-activates relay nodes based on local conditions evaluated using connectivity reports such that a high network performance is ensured. On one hand, the solution keeps a sufficient number of relay nodes active to assert relay node coverage and that the network connectivity is maintained. On the other hand, the solution avoids an excessively high density of active relay nodes, limiting over the air packet collisions and degraded network performance. The solution according to the present disclosure is also dynamic and adapts the relay node configuration to changes in the network topology caused by, for example, node mobility or nodes being added to or removed from the mesh network.

According to an embodiment, the connectivity report comprises an identifier of the beacon node and a number of hops required to reach the beacon node. The connectivity report may be formulated as a number of hops to a specific node—the beacon connectivity node in the network.

According to an embodiment, the number of hops are determined from an initial Time To Live, TTL, value and a received TTL value comprised in said connectivity control message. The skilled person understands that these values are usually contained in messages being transmitted in the mesh network. Alternately, the connectivity report may also contain additional information such as the number of hops to one or more regional beacon nodes.

In an embodiment, the step of transmitting the query message occurs periodically at a predetermined time period. Every node with an active relay feature, may periodically check whether its relay feature may be deactivated. The period may be related to the frequency of receiving connectivity control messages. For example, a node may wait for at least 3 connectivity control messages before initiating a deactivation procedure. It may be understood that different nodes in the network are assigned different periods for initiating deactivation procedure such that no two nodes simultaneously initiate a deactivation procedure.

One option is to determine the average period based on the number of relay nodes in the mesh network, and to determine the actual timing using a random experiment using half the average period as the expected value.

In an example, the method further comprises a step of receiving, by the relay node, an instruction, from a central entity in the mesh network, to initiate the transmitting of the query message to the neighbouring nodes. Alternately, the deactivation can be token based, where only one relay node in the network is holding the token at any point of time. After a particular relay nodes has evaluated deactivation, the token may be passed on to another relay node. These actions may be controlled by a central entity such as a gateway device in the mesh network.

According to an example, the step of transmitting the connectivity report to neighbouring nodes occurs periodically at a predetermined period. The skilled person understands that the period with which the connectivity reports are transmitted and the period with which the query messages are transmitted may be two different periods.

In an example, the connectivity report further comprises a current status of said relay feature. This may be beneficial to the neighbouring node in order to determine which of its neighbouring relay nodes are active and which are in a deactivated state.

In a second aspect of the present disclosure, there is presented a method for supporting deactivating a relay feature of a relay node in a mesh network comprising a plurality of nodes, wherein the relay node formulates a connectivity report containing routing information to a beacon node in the network, the routing information being based on connectivity control messages received from the beacon node.

The method comprises the steps of receiving, by a node, a connectivity report from each of its neighbouring relay nodes, receiving, by the node, a query message from at least one neighbouring relay node, the query message being arranged to query whether the relay feature of the relay node may be deactivated, determining, by the node, based on the received plurality of connectivity reports, that the relay feature may be deactivated, and transmitting, by the node, a response message in response to the query message indicating that the relay feature may be deactivated.

This method is performed by all nodes in the network that receive a deactivation request from a neighbouring relay node. Such a node may already be a relay node with an active or deactivated relay feature.

According to an embodiment, the received connectivity control messages comprise an initial Time to Live, TTL, value when transmitted by the beacon node and wherein the node determines a connectivity status based on the initial TTL value and a received TTL value.

According to an example, the step of determining is based on at least one of determining, by the node, that a connectivity to a beacon connectivity node will not be lost upon deactivating the relay feature of the relay node;

determining, by the node, that the number of hops to a beacon connectivity node does not increase more than an absolute value, for example eight, or a relative threshold value, for example 50%;

determining, by the node, that the number of neighbouring relay nodes with an active relay feature does not decrease below a threshold value, for example 4.

The criteria defined here are merely exemplary. Other criteria such as a latency in receiving messages may also be utilised to establish the connectivity status.

In a third aspect of the present disclosure, there is presented a node in a mesh network comprising a plurality of nodes, the node comprising a relay feature that can be activated or deactivated, wherein in an active state the node is capable of forwarding messages received by the device, in the mesh network.

The node comprises process equipment arranged for creating a connectivity report based on connectivity control messages received from a beacon control node, transmit equipment arranged for transmitting the connectivity report to all its neighbouring nodes, the transmit equipment being further arranged for sending periodically a query message to neighbouring nodes wherein the query message is arranged to query whether the relay feature of the node may be deactivated, receive equipment arranged for receiving response messages from neighbouring nodes, wherein the response messages indicate that the relay feature may be deactivated, and deactivate equipment arranged to deactivate the relay feature of the node upon receiving the response messages from all of its neighbouring nodes.

In a fourth aspect of the present disclosure, there Is presented a beacon node in a mesh network comprising a plurality of nodes, the beacon node supporting an always active relay feature, the beacon node comprising transmit equipment arranged to periodically transmit a connectivity control message.

According to an embodiment, the beacon node is a logical entity, for instance, physically located in a gateway device of the mesh network. It may be advantageous to place the beacon node within a gateway device in the mesh network since most of the traffic of the mesh network traverses the gateway device and connectivity within the mesh network may be established by determining the connectivity with the gateway device.

In a fifth aspect of the present disclosure, there is presented a computer program product, comprising a computer readable storage medium storing instructions which when executed on at feast one processor cause the at least one processor to carry out the method according to any one of the methods presented in this disclosure.

DETAILED DESCRIPTION

Some of the embodiments contemplated herein will now be described more fully with reference to the accompanying drawings. Other embodiments, however, are contained within the scope of the subject matter disclosed herein, the disclosed subject matter should not be construed as limited to only the embodiments set forth herein; rather, these embodiments are provided by way of example to convey the scope of the subject matter to those skilled in the art.

Figure 1:
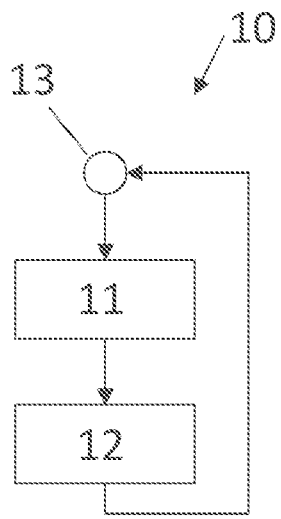
FIG. 1 schematically illustrates the actions of a beacon node in a mesh network according to the present disclosure.

FIG. 1 schematically illustrates the actions 10 of a beacon node in a mesh network according to the present disclosure. The beacon connectivity node broadcasts 11 a Beacon Connectivity Control message at regular intervals. The purpose of the Beacon Connectivity Control message is to facilitate connectivity monitoring in the nodes of the network. As long as all nodes receive the connectivity control message, the network is connected in the sense that it is possible to find a path from any node in the network to any other node.

Typically, the connectivity control message is designed such that it is possible to assess the connectivity conditions, for example, in terms of number of hops, to the beacon connectivity node from the received Beacon Connectivity Control message. The beacon node waits 12 for a specified amount of time before broadcasting 11 the Beacon Connectivity Control message again. The beacon node is in initial state 13 and returns to the initial state 13 after performing steps 11-12.

Figure 2:
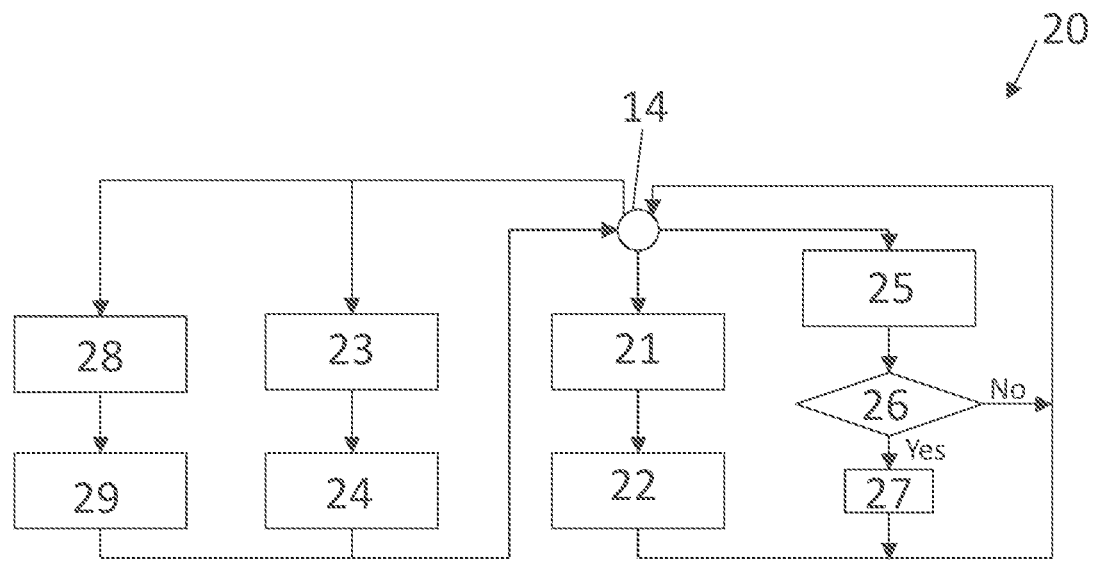
FIG. 2 schematically illustrates the actions of a relay node in a mesh network according to the present disclosure.

FIG. 2 schematically illustrates the actions 20 of a relay node in a mesh network according to the present disclosure. Every relay node sends 21 a connectivity report message to its neighbouring nodes. The term "neighbouring node" refers to a node that is within one hop of a particular node. The relay node typically waits 22 for a predetermined amount of time before retransmitting the connectivity report again to all its neighbouring nodes. By periodically transmitting the connectivity report, one can be sure that the neighbouring nodes have the latest information regarding the connectivity status of the relay node and network as a whole. The relay node is in an initial state 14. It returns back to the initial state after performing any of the possible actions specified herein.

It may be understood that the period of sending connectivity reports is greater than the period of receiving Beacon Connectivity Control messages. Alternately, it may be imagined that a relay node waits for at least one Beacon Connectivity Control message before sending out a connectivity report. The connectivity report is sent out by each relay node with a relay feature, irrespective of whether the relay feature is active or not. It may further be beneficial to include the current status of the relay feature in the connectivity report.

Upon receiving 23 a Beacon Connectivity Control message, a relay node determines 24 its connectivity status with the beacon node. The connectivity status may be determined by evaluating the number of hops from the relay node to the beacon node. For example, the Beacon Connectivity Control message is broadcasted with an initial Time To Live, TTL, value. A relay node, upon receiving the Beacon Connectivity Control message, can determine the number of hops needed to reach the beacon node from a received TTL value and the initial TTL value. The connectivity report, may then be, formulated wherein a connectivity report comprises an identification of a beacon node and the number of hops needed for a message transmitted from the relay node to reach the beacon node.

In a step 25, the relay node starts a deactivation procedure to turn off a relay feature of the relay node. The deactivation procedure may be initiated periodically. If performed on a regular basis, the period of such relay node deactivation must be long in comparison to the transmission period of the Beacon Connectivity Control message. One option is to determine the average period based on the number of relay nodes in the network, but determine the actual timing using a random experiment using half the average period as the expected value. This is done to limit the risk of deactivation of multiple relay nodes at the same time. Alternately, the deactivation procedure may be initiated upon receiving an instruction from a central entity. Such a deactivation can be token based wherein only one relay node in the network is holding the token at any point of time. After evaluation of deactivation by a relay node holding the token, the token is passed on to another relay node.

In step 26, it is determined whether all the neighbouring nodes of the relay node approve turning off the relay feature of the relay node. This is determined by sending out a query message to the neighbouring nodes and in response to the query message receiving either an approval or a rejection from the neighbouring devices. If all the neighbouring devices approve the relay feature being turned off, the relay feature of the relay node is turned off 27. If, on the other hand, the relay node receives at least one response with a rejection, the relay feature Is maintained in an active state until the initiation of a further deactivation procedure.

Relay node activation may be requested by neighbouring mesh nodes, and such mesh nodes evaluate the impact of relay node activation on a regular basis or upon demand. For example, mesh nodes may evaluate the impact of relay node activation each time it receives a new Beacon Connectivity Control message or a new connectivity report message. If the evaluation indicates that the activation of one, or several, of its deactivated neighbour relay nodes would have a significant positive effect on the node's connectivity, the node may request the relay node to turn the relay feature on.

A relay node, with a deactivated relay feature, upon receiving 28 a request from a neighbouring mesh node to turn on the relay feature, activates 29 the relay feature.

Figure 3:
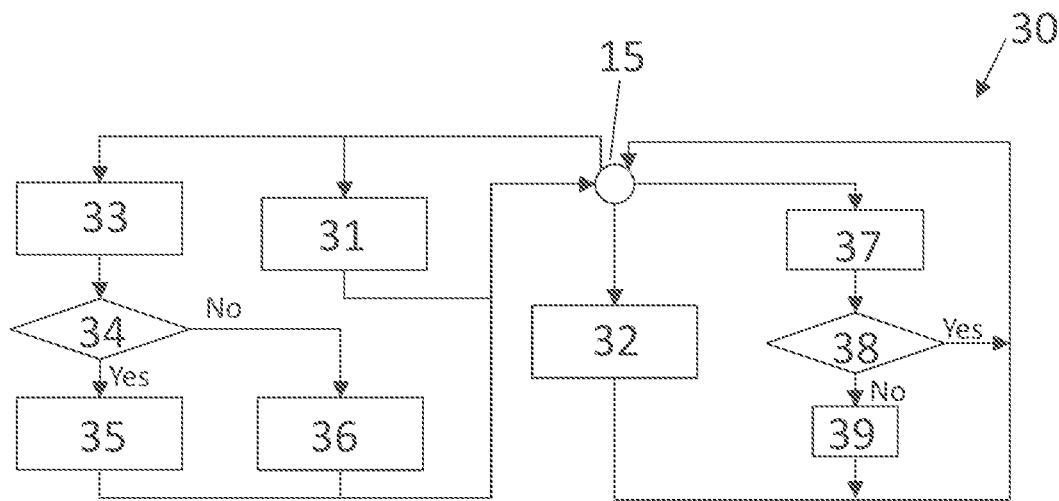
FIG. 3 schematically illustrates the actions of a node in a mesh network according to the present disclosure.

FIG. 3 schematically illustrates the actions of a node in a mesh network according to the present disclosure. All nodes in the network receive 31 a Beacon Connectivity Control message. With this, a connectivity status between the node receiving the connectivity control message and the beacon node in the mesh network may be established. The connectivity status may, for example, be established as a number of hops from the node to the beacon node. The number of hops may be determined from an initial TTL value in the connectivity control message and the received TTL value upon receiving the connectivity control message. The step 31 is repeated periodically with a predetermined period.

The mesh node also receives 32 periodically, a connectivity report message from its neighbouring relay nodes. The period of receiving the connectivity report messages may be the same as that of receiving the connectivity control messages. The node may receive 33 a request, from a neighbouring relay node, to deactivate the relay feature of the neighbouring relay node.

Upon receiving the request for deactivation in a step 33, the node evaluates 34, the connectivity of the node within the mesh network. This may be done by, for example, determining the number of hops to a global beacon node in the mesh network. The node may also evaluate the connectivity if the relay feature of the relay node, from which the deactivation request was received, is deactivated. A sample list of criteria before approving the deactivation request may be:

The connectivity to the beacon connectivity node is not lost.

The number of hops to the beacon connectivity does not increase more than an absolute or relative threshold value—for example, 3 hops or 50%, or that the absolute hop-count towards the beacon connectivity node does not exceed an absolute threshold, for example 10 hops.

The number of neighbouring relay nodes does not decrease below a threshold level, for example, 2.

If the specified criteria are met, the node sends 35 a response message indicating that the relay feature may be deactivated, if, however, the criteria are not met, the node sends 36 a message indicating to keep the relay feature active. The skilled person understands that each node in the mesh network may have a different criteria for approving or disapproving a request to deactivate the relay feature in the mesh network. Such criteria, may be stored locally at the node at the time of commissioning the node in the mesh network.

The node may also periodically evaluate 37 its connectivity in the mesh network, independently of receiving a request for deactivation from a neighbouring relay node. In step 37, the different parameters to determine connectivity, such as, a number of hops to the beacon connectivity node, number of active neighbouring relay nodes are determined. In a step 38, the node checks whether the evaluated parameters satisfy the connectivity criteria of the node device within the mesh network.

If connectivity is good, the node takes no further actions, and if the evaluated parameters do not fulfil the connectivity criteria of the node, the node sends 39 a message to a currently deactivated relay node requesting to activate the relay feature. The node is in an initial state 15 and returns back to the initial state 15 after performing any of the possible actions specified herein.

Figure 4:
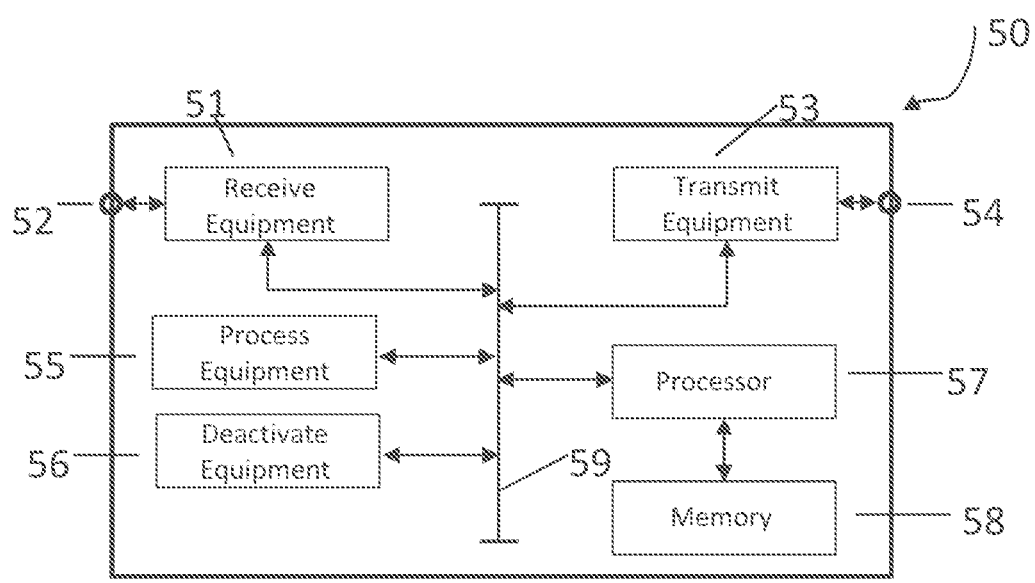
FIG. 4 schematically illustrates a relay node according to the present disclosure.

FIG. 4 schematically illustrates a relay node 50 according to the present disclosure. The relay node 50 comprises process equipment 55 arranged for creating a connectivity report based on connectivity control messages received from a beacon control node. The transmit equipment 53, 54 is arranged for transmitting said connectivity report to all its neighbouring nodes. The transmit equipment 53, 54 is further arranged for sending periodically a query message to neighbouring nodes wherein the query message is arranged to query whether the relay feature of the node may be deactivated.

The relay node 50 also comprises receive equipment 51, 52 arranged for receiving response messages from neighbouring nodes, wherein the response messages indicate that the relay feature may be deactivated. The skilled person understands that the receive equipment 51, 52 is also arranged for receiving the connectivity control messages from the beacon node. The relay node 50 further comprises deactivate equipment 56 arranged to deactivate the relay feature of the relay node 50 upon receiving the response messages from all of its neighbouring nodes.

The relay node 50 also comprises a processor 57 and memory 58. The memory 58 being arranged to store a set of processor executable instructions, which when executed by the processor 57 cause the node to perform a method according to the present disclosure. The various internal equipments communicate with one another via the bus 59.

Figure 5:
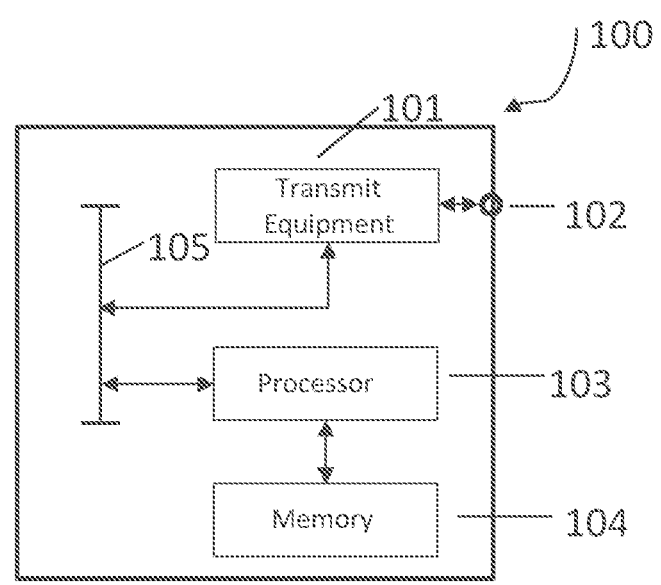
FIG. 5 schematically illustrates a beacon node according to the present disclosure.

FIG. 5 schematically Illustrates a beacon node 100 according to the present disclosure. The beacon node 100 comprises a transmit equipment 101, 102 arranged to periodically transmit Bacon Connectivity Control messages in the mesh network. The beacon node 100 also comprises a processor 103 and memory 104. The memory 104 being arranged to store a set of processor executable instructions, which when executed by the processor 103 cause the node to perform a method according to the present disclosure. The various internal equipments communicate with one another via the bus 105. The beacon node 100 may be a logical entity that is physically located within another node in the mesh network such as, for example the gateway node. It may further be beneficial to note that the beacon functionality is located in a node whose relay feature is always maintained in an active state.

The method is further illustrated with an example. For example, imagine a node n0 that from the global Beacon Connectivity Control message calculates that there are 6 hops to the global beacon connectivity node b0. It also receives Beacon Connectivity Control messages from the regional beacon connectivity nodes b1 and b2, associated with a hop count of 2 and 5, respectively. Imagine further that the node n0 has 6 neighbor relay nodes [r0, r1 . . . r5], and that the respective Relay Connectivity Report messages read as in the following table.

| Sender (source/ SRC) | Relay feature status (ON/OFF) | Beacon connectivity report [(beaconId0, hopCount0), (beaconId1, hopCount1), . . . ] (list of variable length) |
| --- | --- | --- |
| r0 | OFF | [(b0, 4), (b1, 2)] |
| r1 | ON | [(b0, 9), (b2, 5)] |
| r2 | ON | [(b0, 5), (b1, 1)] |
| r3 | OFF | [(b0, 12)] |
| r4 | ON | [(b0, 9)] |
| r5 | ON | [(b0, 10), (b2, 4)] |

In this case, node n0 may conclude that:
  It has 4 active relay node neighbours—r1, r2, r4 and r5, and two deactivated relay node neighbours—r0 and r3. Each neighbour relay node has a path towards the global beacon connectivity node b0.
  The best available path from n0 towards b0 is over r2.
  If r0 is activated, n0 connectivity to b0 improves from 6 hops to 5 hops, and n0 would have 5 active relay node neighbours.
  If r2 is deactivated, n0 connectivity towards b0 degrades from 6 hops to 10 hops, and n0 would have 3 active relay node neighbours.
  Some of n0's neighbour relay nodes receive Beacon Connectivity Control messages from the regional beacon connectivity nodes b1 or b2
  Node n0 uses these metrics when evaluating if it can grant that any of its active neighbour relay nodes turn the Relay feature off, and when evaluating if it should request any of its deactivated neighbour relay nodes to turn the Relay feature on.

Say further that node n0's target is to have at least 3 active relay node neighbours ("degree 3") and grants deactivation of a neighbour relay node if the hop-count increase towards b0 does not exceed by 3. For simplicity, it may be assumed that node n0 has no need of improving the connectivity towards b1 and b2. However, the skilled person understands that the requirements can easily be extended with additional connectivity requirements also for the regional beacon connectivity nodes.

If n0 now receives a deactivation request from r2 it evaluates that:
  The number of active relay node neighbours would decrease from 4 to 3, and
  The hop-count towards b0 would increase from 6 to 10.
  Node n0 can accept the first outcome, but not the second outcome as the hop count in the new situation would have increased by 4, and hence rejects the deactivation request from r2.
  Similarly, if n0 receives a deactivation request from r5 it evaluates that:
  The number of active relay node neighbours would decrease from 4 to 3, and
  The hop-count towards b0 would be unchanged.
  As n0 can accept both the first and the second outcomes, it grants the deactivation request from r5, and relay node r5 may be deactivated.

Other variations to the discloses examples can be understood and effected by those skilled in the art of practicing the claimed disclosure, from a study of the drawings, the disclosure and the appended claims. In the claims, the word "comprising" does not exclude other elements or steps, and the indefinite article "a" or "an" does not exclude a plurality. A single processor or other unit may fulfil the functions of several items recited in the claims. The mere fact that certain measures are recited in mutually different dependant claims does not indicate that a combination of these measures cannot be used to advantage. A computer program may be stored/distributed on a suitable medium, such as an optical storage medium or a solid-state medium supplied together with or as part of other hardware, but may also be distributed in other forms, such as via the Internet or other wired or wireless telecommunication systems. Any reference signs in the claims should not be construed as limiting the scope thereof.

The present disclosure is not limited to the examples as disclosed above. They can be modified and enhanced by those skilled in the art beyond the scope of the present disclosure as disclosed in the appended claims without having to apply inventive skills.

The invention claimed is:

1. A method for deactivating a relay feature of a relay node in a mesh network comprising a plurality of nodes, wherein said relay node formulates a connectivity report comprising routing information to a beacon node in said mesh network, said routing information being based on connectivity control messages received from said beacon node, said method comprising:
  transmitting, by said relay node, said connectivity report to neighboring nodes;
  transmitting, by said relay node, a query message to said neighboring nodes for querying whether said relay feature of said relay node may be deactivated;
  receiving, by said relay node, response messages from said neighboring nodes, in response to said query message, wherein each of said response messages indicates whether said relay feature of said relay node may be deactivated; and
  deactivating, by said relay node, said relay feature of said relay node responsive to the response messages all indicating that said relay feature of said relay node may be deactivated, and otherwise not deactivating said relay feature of said relay node.

2. The method according to claim 1, wherein said connectivity report comprises an identifier of said beacon node and a number of hops required to reach said beacon node.

3. The method according to claim 2, wherein said number of hops are determined from an initial Time To Live (TTL) value and a received TTL value in said connectivity control messages.

4. The method according to claim 1, wherein said step of transmitting said query message occurs periodically at a predetermined time period, and wherein, for each periodic transmission of the query messages, the relay node determines whether the relay feature of the relay node should be activated or deactivated in dependence on the response messages received from the neighboring nodes.

5. The method according to claim 1, further comprising:
receiving, by said relay node, an instruction, from a central entity in said mesh network, to initiate said transmitting of said query message to said neighboring nodes.

6. The method according to claim 1, wherein said step of transmitting said connectivity report to said neighboring nodes occurs periodically at a predetermined period.

7. The method according to claim 1, wherein said connectivity report further comprises a current status of said relay feature.

8. A method of operation by a node having a plurality of neighboring nodes in a mesh network, said method comprising:
receiving, by said node, connectivity reports from the neighboring anodes, each connectivity report received from a respective one of the neighboring nodes and containing routing information from the respective neighboring node to a beacon node in the mesh network and each connectivity report is based on connectivity control messages received by the respective neighboring node from the beacon node;
receiving, by said node, a query message from one of the neighboring nodes, said query message querying whether a relay feature of the one of the neighboring nodes may be deactivated;
determining, by said node, based on said connectivity reports, whether, with respect to connectivity of said node within the mesh network, said relay feature may be deactivated; and
transmitting, by said node, a response message in response to said query message indicating whether said relay feature may be deactivated.

9. The method according to claim 8, wherein said connectivity control messages comprise an initial Time To Live (TTL) value when transmitted by said beacon node, and wherein said node determines a connectivity status based on said initial TTL value and a received TTL value.

10. The method according to claim 8, wherein said step of determining is based on at least one of:
determining, by said node, that a connectivity to a beacon connectivity node will not be lost upon deactivating said relay feature of said relay node;
determining, by said node, that a number of hops to a beacon connectivity node does not increase more than an absolute or relative threshold value; and
determining, by said node, that a number of the neighboring anodes with an active relay feature does not decrease below a threshold value.

11. A node in a mesh network comprising a plurality of nodes, said node comprising a relay feature that can be activated or deactivated, wherein, while the relay feature is activated, in an active state said node is operative to forward messages received by said node, in said mesh network, said node comprising:
transmitter circuitry and receiver circuitry; and
processing circuitry operatively associated with the transmitter circuitry and the receiver circuitry and configured to:
create a connectivity report based on connectivity control messages received from a beacon control node;
transmit said connectivity report to neighboring nodes in the mesh network;
periodically send a query message to the neighboring nodes, querying each of the neighboring nodes as to whether said relay feature of said node may be deactivated;
receive response messages from the neighboring nodes, in response to the query message, wherein each response message indicates whether said relay feature may be deactivated; and
deactivate said relay feature of said node responsive to determining that all response messages indicate that the relay feature may be deactivated, and otherwise not deactivating the relay feature.

* * * * *

UNITED STATES PATENT AND TRADEMARK OFFICE
CERTIFICATE OF CORRECTION

PATENT NO. : 10,993,168 B2
APPLICATION NO. : 16/094068
DATED : April 27, 2021
INVENTOR(S) : Rimhagen et al.

It is certified that error appears in the above-identified patent and that said Letters Patent is hereby corrected as shown below:

In the Specification

In Column 3, Line 13, delete "nodes" and insert -- node --, therefor.

In Column 5, Line 53, delete "feast" and insert -- least --, therefor.

In Column 7, Line 30, delete "Is" and insert -- is --, therefor.

In Column 8, Line 17, delete "deactivated, if," and insert -- deactivated. If, --, therefor.

In Column 9, Line 1, delete "Illustrates" and insert -- illustrates --, therefor.

In Column 10, Line 26, delete "dependant" and insert -- dependent --, therefor.

In the Claims

In Column 11, Line 27, in Claim 8, delete "anodes," and insert -- nodes, --, therefor.

In Column 12, Line 15, in Claim 10, delete "anodes" and insert -- nodes --, therefor.

Signed and Sealed this
Fourteenth Day of December, 2021

Drew Hirshfeld
*Performing the Functions and Duties of the*
*Under Secretary of Commerce for Intellectual Property and*
*Director of the United States Patent and Trademark Office*